3,380,818
GLASS COMPOSITION AND METHOD AND PRODUCT

William E. Smith, Sylvania Township, Lucas County, Ohio, assignor to Owens-Illinois, Inc., a corporation of Ohio
No Drawing. Filed Mar. 18, 1964, Ser. No. 352,958
12 Claims. (Cl. 65—33)

ABSTRACT OF THE DISCLOSURE

A new thermally crystallizable glass having a liquidus temperature below 2460° F. and having excellent forming properties. The glass composition is of the $$SiO_2\text{-}Al_2O_3\text{-}Li_2O\text{-}MgO$$

system, each ingredient being in a certain range, and contains from 1 to 1.7 weight percent $ZrO_2$ and from 1 to <2.4 weight percent $TiO_2$. Glass-ceramics and the method for making them from the aforesaid components are also disclosed.

---

The present invention relates to new thermally crystallizable glasses comprising $SiO_2$, $Al_2O_3$, $Li_2O$, MgO and limited amounts of both $ZrO_2$ and $TiO_2$. In one aspect the invention relates to new ceramics made by in situ crystallization of a multitude of finely divided crystals from such glasses in a controlled manner. In another aspect the invention relates to a method for making ceramic articles by first forming articles of such glasses and thereafter thermally effecting in situ crystallization.

It is an object of the present invention to provide new thermally crystallizable glasses with good working properties suitable for commercial melting and automatic machine forming processes, as well as for lamp working in the glassy state. A further object is to provide new ceramics resulting from the in situ crystallization of such glasses. A still further object is to provide a method for making ceramic articles having a low coefficient of thermal expansion and other desirable properties.

Other objects, as well as aspects and advantages, of the invention will be come apparent from the accompanying disclosure.

In the preparation of glass-ceramics, titanium dioxide is a known agent for promoting the in situ formation of many fine crystals, by heat treatment of basic glasses rich in magnesium and aluminum and containing calcium and less than 50 percent silica, by a two stage nucleation and crystallization heat treatment. In these products the main crystalline forms are those of the augite group [1]. Titania has also been used as a nucleant to make glass-ceramics from glasses whose composition is such that the main or predominant crystalline form which results is beta-spodumene or some form of crystalline material similar to beta-spodumene, as shown by X-ray diffraction. However, in order to get adequate crystallization it has been found necessary to employ at least 3 weight percent of titanium dioxide, usually more; see British Patent 857,367, for instance. The use of such appreciable amounts of titanium dioxide in glass compositions suffers from the disadvantage that it is a highly expensive material, in addition to several technical disadvantages.

Perhaps the most serious technical problem with such glass-ceramics containing around 60–75% $SiO_2$, 15–25% $Al_2O_3$, 2–6% $Li_2O$ and over 3% $TiO_2$, together with fluxes, etc. is that the slightest contamination, especially with metals or reducing compounds, of the surface of formed glass articles, before or during crystallization heat treatment, causes a vivid discoloration, usually blue, of the final crystallized product. For instance, I have found that fingerprints often appear in blue on the ceramic product, and even dust particles often cause discoloration. The reason is apparently that $TiO_2$ in such amounts is rather easily reduced to $Ti_2O_3$, a known colored oxide form. Moreover, electric boosting in the melting and refining furnace using molybdenum electrodes cannot be employed in making the glasses because the final product is off-white or light blue, presumably because of the same reduction.

A further disadvantage in the use of such large percentages of titanium dioxide is that the resulting crystallized article has a comparatively dead look because of its extremely high opacity. This is a disadvantage with respect to certain uses of such crystallized ceramics, such as for tableware and cookware. Thus, fine china known as "bone china" has a life and luster and fragility of appearance, because in thin enough sections bone china transmits much more light than such high titania ceramics crystallized from glass.

Another disadvantage of known practical spodumene yielding glasses having over 3 percent $TiO_2$ is that, while such compositions can be formed on automatic glass-forming machinery, they cannot easily be lamped worked without objectionable devitrification. This is because such amounts of $TiO_2$ cause the glass to start crystallization in too short a time at temperatures employed for lamp working. Further, these commercial compositions are extremely difficult to melt, and have such high viscosities at elevated temperatures that they are extremely difficult to fine. During melting and fining they are very corrosive to refractories because of the very high temperatures necessary. For instance, the glass of U.S. Patent 2,960,-801 is substantially that which has been used commercially for several years by its owner to produce cookware. I have found that it cannot properly be melted at 1600° C. (2912° F.) in a reasonable time from batch materials, and melting temperatures of well over 3000° F. would be necesasry in commercial furnaces for any reasonable rate of melting. In press molding it is necessary to introduce this glass to the mold at an extremely high temperature of about 2700° F. At such temperatures the usual stainless steel molds have a very short life; moreover, many special high temperature alloys with better life at high temperatures cannot be used, because the contact with the mold material itself results in the reduction of $TiO_2$ mentioned hereinbefore, causing blue surface coloration.

In United States Patent 3,117,881 to Kenneth M. Henry and the present inventor, it is disclosed that $ZrO_2$ is an excellent nucleating agent for certain glasses when used as disclosed and in large amounts.

However, until the present invention, as far as I know, no one has discovered how to take advantage of the capacity of $ZrO_2$ to promote nucleation in glasses capable of crystallizing to high quality ceramics containing spodumene or spodumene-like crystals, in a glass having suitable properties for large scale melting and forming in high speed automatic forming machinery.

---

[1] See Albrecht, F., "Neuartige Hartstoffe aus Glas," Beispiele Angewandter Forschung, Faunhofer-Gesellschaft Zur Forderung Der Anglwandten Forschung E.V., pp. 19–22, May 1955, and Albrecht et al. German Patent 1,007,231.

Published German patent application 1,099,135 indicates that zirconia can be used as the sole nucleating agent in systems that could yield low expansion crystallized glasses containing beta-spodumene or similar crystalline species, but I have found that the use of zirconia as the sole nucleating agent is ineffective in amounts less than 2 weight precent to promote the nucleation and crystallization needed to produce high quality, low expansion products having flexural strengths necessary in many market applications. More importantly, in such systems the use of the large amounts of zirconia shown in the German application results in glasses having completely unsatisfactory melting and working properties for formation of articles by high-speed automatic machine methods. Thus, the examples in the German application have liquids temperatures well in excess of 2600° F., unacceptably high for melting and forming by commercial high speed automatic methods.

Other investigators have stated that they can produce crystallized glasses nucleated with zirconia plus low amounts of titania, and that the ceramic products have certain properties superior to those of glass-ceramics made with titania as the sole nucleating agent. See, for instance, Belgian Patent 609,529 to Fuji Photo Film Company, Ltd. Compositions shown in this patent using both $ZrO_2$ and $TiO_2$ are not practical for making crystallized products at commercial rates with automatic machinery. For instance, many of the compositions have 8.5 percent or more $Li_2O$, the most expensive ingredient, which costs about $0.80 per pound of $Li_2O$ when obtained from petalite, the cheapest commercial source of iron-free $Li_2O$, needed for white products; and even spodumene which does contain iron (and colors the product) costs about $0.28 per pound of $Li_2O$. Most of the glass compositions shown are not practical in commercial automatic machinery since liquidus temperatures are above about 2600° F. More importantly, all of the compositions contain about 3 percent $B_2O_3$, and this gives the crystalline products a sharp rise in the coefficient of thermal expansion starting at temperatures of about 400–500° C. For instance, this patent itself shows that the average expansion coefficient of Example 7 is $29 \times 10^{-7}$ over the range from 0–500° C., while it is only $2 \times 10^{-7}$ over the range from 100–300° C. Furthermore, the $B_2O_3$ causes a very pronounced yellow discoloration, usually in streaks, in the crystallized products. Also, the high percentages of $Li_2O$ shown in the examples of this patent lower the chemical durability.

In Japanese patent publication 3,912/63 (Apr. 20, 1963) Tashiro et al. have disclosed, subsequent to my invention, glass ceramics said to contain spodumene, using as nucleants $ZrO_2$ with $TiO_2$, always with added $P_2O_5$. However, illustrative glasses therein set forth have completely unsatisfactory properties for automatic forming machinery. Thus, the liquidus temperatures of the glasses suggested therein are extremely high, of the order of 2600° F. or higher. Further, the viscosities of the glasses are much too low at the liquidus temperatures.

Fuji Photo Film Company French Patent 1,337,180 dated July 29, 1963, teaches making transparent ceramic products, or opaque ceramics with a different crystallizing heat treatment. This patent discloses at least 2 and up to 5 weight percent $ZrO_2$, with added $TiO_2$ at the low amounts of $ZrO_2$. Again, the glass compositions disclosed in this patent have extremely high liquidus temperatures of about 2600° F. and higher, unacceptable for automatic high speed press-forming and blow molding methods, at least with mold and furnace materials presently available.

That it is extremely difficult to develop a crystallizable glass composition having good melting and forming properties as a glass, and at the same time having good properties as a crystalline ceramic after heat treatment, is evident from the numerous glasses and ceramics set forth in the publications mentioned hereinbefore, all of which have series shortcomings.

My new compositions, described hereafter, accomplish these very difficultly achieved objectives. Specifically, I have discovered crystallizable glass compositions that can be crystallized to ceramics having a fine, homogeneous structure, zero porosity, low coefficients of expansion and generally high flexural strengths, using low amounts of titania and zirconia in combination. Contemporary workers have made generally similar ceramics from glasses containing high amounts of $TiO_2$ with its attendant disadvantages; or containing high amounts of $ZrO_2$, with or without added $TiO_2$, using glass compositions with disadvantageous working properties. No one known to me, however, has discovered crystallizable glasses containing low percentages of $TiO_2$ and $ZrO_2$ and having good working properties, which glasses crystallize on heat treatment to ceramic products of the present desirable properties. Thus, the patents cited hereinbefore indicate that it is necessary to use at least 2 weight percent $ZrO_2$ or at least 3 weight percent $TiO_2$.

Surprisingly, I have found that my compositions, which contain lower amounts of $TiO_2$, do not suffer from the serious deficiency of the severe inadvertent surface staining during heat treatment, typical of known high titania compositions, even though my compositions contain appreciable amounts of $TiO_2$. Further, the present compositions overcome the other difficulties of both the high $TiO_2$ and the high $ZrO_2$ compositions which have been mentioned hereinbefore; not only are my glasses easily melted and refined and easily formed on automatic machinery, but also they are easily lamp worked. Other advantages of the present compositions will be more specifically set forth hereafter.

I have now discovered new glass compositions which not only can be heat treated to form new low-expansion, non-porous ceramic products by in situ crystallization, but which also have sufficiently low liquidus temperatures and other glass-working properties to enable them to be easily melted and to be formed in high speed automatic machinery; at the same time the glasses of the invention can be lamp worked without encountering objectionable crystallization during lamp working. I have further discovered methods for heat treating such glasses to convert them to new ceramic products with desirable properties.

Glasses of the present invention have liquidus temperatures below 2460° F. and contain at least the following essential components in the following weight percentage limits based on the total composition:

TABLE I

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |

In addition, other useful and purposely added components include $SnO_2$ up to 1.7, $P_2O_5$ up to 3 (usually 0–2), $BaO$ up to 5, and $ZnO$ up to 3, all in weight percent of the glass composition. Further, small amounts of residual arsenic and antimony oxides are often present in the compositions, since arsenic and antimony compounds are often used as fining agents. In actual practice, arsenic, expressed as $As_2O_3$, is usually present in amounts not more than 0.3 weight percent, and antimony, expressed as $Sb_2O_5$, is seldom present in amounts over 1 weight percent. Also $Na_2O$ while not particularly desirable, is often present to a certain degree as an impurity, usually in amounts not over 1.5 weight percent. Further, when $As_2O_3$ is used as a fining agent, it is commonly added together with a little $NaNO_3$, a well-known practice. Another additive sometimes employed is F, usually in amounts not exceeding 0.4 weight percent. It is, of course, added as a salt in the usual manner, and seems to aid the crystallization process somewhat when it is employed. In summary, then, the compositions of the present invention contain the following, aside from F and such fining agents as may be used:

TABLE II

| | |
|---|---|
| $SiO_2$ | 66–73 |
| $Al_2O_3$ | 15–19 |
| $Li_2O$ | 2.5–4 |
| MgO | 3–7.7 |
| $ZrO_2$ | 1–1.7 |
| $TiO_2$ | 1–<1.9 |
| $SnO_2$ | 0–1.7 |
| $P_2O_5$ | 0–3 |
| BaO | 0–5 |
| ZnO | 0–3 |

Thus, the present glass and crystalline ceramic compositions have the components of Table II in the amounts named as essential ingredients, and in the compositions of the invention almost always, and certainly preferably, contain from 95 to 100 weight percent of such components, the other 5 to 0 percent being other compatible inorganic ingredients, usually oxides or halides. Thus, the essential properties of the present glasses are usually lost with a total of over 5 percent of additives not set forth in Table II; indeed, the essential properties can be lost with the addition of 5 percent or less of such unnamed components, if the attempt be deliberately made. For instance, inclusion of 4 or 5 weight percent $V_2O_5$ in glasses of Table II would produce a glass having a liquidus well above 2460° F., contrary to an essential feature of the present glasses.

It should be noted that MgO in the higher part of the range tends to give higher expansion ceramic products. I therefore often prefer to limit MgO to the range 3–6 weight percent.

In any composition containing fluorine, an equivalent amount of oxygen must be subtracted in order to obtain a precise weight percent composition, as will be understood, although the effect is negligible.

In order to obtain adequate "nucleation" of the glasses of the invention the total weight percent of the glass of $ZrO_2+TiO_2+SnO_2+P_2O_5$ is at least 2.8 weight percent. In many cases this low a total gives somewhat borderline results, and it either takes an excessively long heat treatment time to obtain adequate nucleation with only 2.8 weight percent, or the crystallized product will have only minimum acceptable properties, in terms of flexural strength and expansion coefficient, and may approach the upper acceptable limit of crystal size. Consequently, it has been found that a lower limit for the total of $ZrO_2+TiO_2+SnO_2+P_2O_5$ of at least 3 weight percent of the total composition gives generally better results or more leeway in control of heat treatment schedules. The difference in amount may seem small, but the difference in results can be dramatic in a given instance. The maximum total of $ZrO_2+TiO_2+SnO_2$ employed is 4 weight percent; although larger total amounts can be used, this results in a glass that is somewhat less stable and consequently somewhat more difficult to lamp work without encountering appreciable premature crystallization.

$P_2O_5$, while not termed a "nucleant" herein, appears to aid crystallization; also, it appears to aid in forming a glossy ceramic surface, and I thus often employ phosphorus compounds in my compositions, at least 0.5 weight percent expressed as $P_2O_5$.

MgO is an especially important component of the present crystallizable glasses. Some "flux" must be employed to dilute the silica and alumina so that the components can be melted to a glass at reasonable furnace temperatures, to obtain a glass with a reasonable liquidus, and to reduce the viscosity of the glass. While additional $Li_2O$ would reduce viscosities, when $Li_2O$ is used in the amounts necessary for viscosity reduction, the cost of the glass batch is greatly increased; more importantly, the resulting crystallized products have poor chemical durability.

BaO could be used for this purpose instead of MgO, but its effect per unit weight percent on the viscosity is so much less than MgO, that the large amounts of BaO that would be required are deleterious to the product, although BaO has been found to be useful in small amounts, when present together with MgO.

CaO and $K_2O$ cannot replace MgO for viscosity reduction, both because relatively large amounts would be necessary, and also because these oxides retard crystallization in my compositions. $Na_2O$ would also have to be used in excessive amount to sufficiently reduce the viscosity, and such amounts are deleterious to the product properties. Also, ZnO has some fluxing action, but it also cannot be employed in large enough amounts necessary to adequately reduce viscosity.

Since $Li_2O$ is also a powerful flux I have found that the amount of $Li_2O$ must be correlated with the amount of MgO. Thus, in order to obtain suitable glass working properties and at the same time obtain suitable ceramic products on heat treatment, I have found that the combined weight percent of $Li_2O$ plus MgO should be at least 6.3, and is usually at least about 7 weight percent of the total glass composition, and that this combined percentage is not over 10.5 weight percent.

As stated, the glasses and resulting ceramics of the invention are preferably at least 95 weight percent $SiO_2$, $Al_2O_3$, $Li_2O$, MgO, $ZrO_2$, $TiO_2$, $SnO_2$, $P_2O_5$, BaO and ZnO. When colored articles are desired, small amounts of coloring agents can be added; also, small amounts of $Na_2O$ are usually present, but the glass should ordinarily not contain more than 2, preferably 1.5, weight percent $Na_2O$. $K_2O$, if present, should be not more than 1 percent, preferably much less as it retards crystallization; for the same reason amounts of CaO over 2 percent are undesirable. Usually, the combined total of $Na_2O$ plus $K_2O$ should not be over 2 percent, and the total of CaO plus $Na_2O$ plus $K_2O$ not over 2.5 weight percent. $B_2O_3$ is especially deleterious in the present compositions, and should not be employed in amounts over 2 weight percent, preferably not over 1 percent, since this component causes the crystallized product to have a sharp rise in the coefficient of thermal expansion at elevated temperatures; moreover, it causes a yellow discoloration of compositions of the present invention upon crystallization, often uneven and in streaks.

The maximum percentage of $ZrO_2$ is extremely critical in the present compositions. Thus, in the range of about 1.5 to about 1.6 weight percent $ZrO_2$, the liquidus of the glass composition is greatly affected; indeed, the liquidus of most of the glass compositions will sharply rise when going from 1.4 or 1.5 to 1.6 or 1.7 weight percent $ZrO_2$, and it is to be noted that the maximum amount of 1.6 to 1.7 weight percent zirconia cannot be tolerated in a number of the otherwise possible compositions of this invention, since it will often make the liquidus temperature be over 2460° F. This is usually true in the case of compositions having near the minimum amounts of combined $Li_2O$ and MgO. Similar effects are encountered with $SnO_2$ when employed in the maximum amounts indicated.

I have also discovered that, while the nucleants, $ZrO_2$ and $SnO_2$, in amounts appreciably over 1.5 to 1.7 weight percent will individually quite spectacularly raise the liquidus temperatures of the glass compositions of the present invention, this effect is not additive, and I can employ combined amounts of $ZrO_2$ and $SnO_2$ well over 1.5 weight percent without raising the liquidus substantially more than if only one of the oxides had been present, so long as the individual maximum amounts of $ZrO_2$ or $SnO_2$ are about 1.5 or 1.6 weight percent.

In the present application the constituents of my glasses which I arbitrarily define as "nucleants" or "nucleating agents" are $ZrO_2$, $TiO_2$ and $SnO_2$. There have been theories espoused in the past that such "nucleating agents" form nuclei by precipitating as submicroscopic crystallites of $TiO_2$, $ZrO_2$, etc., and that the major crystalline species formed by later heat treatment crystallize directly upon these nuclei. However, it now appears probable that many of these prior art glasses, and also the glasses of the present invention, first form a microscopic or submicroscopic dispersed glass phase, and that this disperse phase somehow initiates the formation of the main crystalline species, in some manner enabling the major crystalline species to crystallize substantially homogeneously throughout the mass of glass being heat treated, and helping to limit the maximum size of the crystals by providing many sites for crystal initiation. In any case, the term "nucleant" or "nucleating agent" as used in the present application refers only to the three oxides mentioned, and the term merely means that such oxides have the effect in the glass, when properly heat treated, of causing the formation of larger numbers of homogeneously dispersed crystals in the glass than would be the case without the nucleant. Other ingredients of the present glass composition appear to fullfill the foregoing criteria or definition to a certain extent. Thus, $P_2O_5$ when present with the nucleants seems to have some additive effect in obtaining more complete and satisfactory nucleation and crystallization, especially when using lower amounts of the nucleants. Also, fluorine appears to speed the process of nucleation and crystallization, so much that in amounts substantially in excess of 0.4 weight percent of fluorine retained in the glass, the speed of crystallization is so fast as to sometimes cause cracking of the product, presumably because of exothermic effects during crystallization. Because of this, it is usually preferred that the weight percent retained fluorine be not more than 0.25. It is further noted that even zinc oxide in some compositions appears to aid somewhat in the crystallization process.

Advantages of the present glass-ceramics include an appearance of translucency in thin sections, in contrast to known high $TiO_2$ glass-ceramics, giving the product an appearance similar to bone china, and the effect is believed to be partly attributable to the low amount of $TiO_2$ employed, as indicated in Table II. Further, the superior lamp working properties of the present glasses are best obtained when the $TiO_2$ is less than 1.9 weight percent.

According to a usually less preferred embodiment of my invention, the hereinbefore set forth composition of my glasses and ceramics is modified to the extent that $TiO_2$ is present in the range 1.9–<2.4 weight percent, when one is willing to forego the full economic and technical advantages of the lower $TiO_2$ containing compositions of the invention. For instance, in a given composition, the higher $TiO_2$ content makes for a product that can still be fairly easily lamp worked, but with care not to heat the glass for too long a time in the crystallization temperature range and the nucleation range, or undue premature crystallization will be encountered. Also, the "bone china" appearance in crystallized products is somewhat lessened.

As stated, the range of glass compositions of the present invention are practical from the standpoint that they have liquidus temperatures below 2460° F., usually considerably lower, and can therefore be handled in commercial equipment without danger of devitrification in cold spots in furnaces. Moreover, the present compositions can be melted at commercial rates at glass temperatures of about 2900° F. or less, thus avoiding undue corrosion of ordinary high quality, high alumina refractories, such as Monofrax M, for instance.

A further particular advantage of the present range of glasses is that the components can be so proportioned that the high temperature viscosity can have just about any commercially desirable relationship to the liquidus temperature of the glass. Thus, for automatic pressing operations and for automatic blowing operations, especially the former, it is desirable to have a glass whose liquidus temperature is not more than 200° F. about the temperature at which the logarithm of the viscosity in poises is 4, preferably not more than 100° F.; also, in order to have reasonable operating temperatures in the forehearth and feeder of the furnace, and to have a not too severe temperature when the glass initially contacts the material of the molds, it is preferred that this log 4 temperature not exceed 2450° F. In this connection it is to be noted that a special advantage of the nucleant, $ZrO_2$, is that it is also an excellent flux, and 1 percent of this component reduces the glass viscosity at high temperatures much more than 1 percent of MgO or 1 percent of $TiO_2$, and nearly as much as 1 percent of $Li_2O$.

I have discovered a relationship by which the log 4 viscosity temperature of my glasses can be quite accurately calculated, and, using this relationship as a guide, one can quickly arrive at a glass having a desired log 4 viscosity temperature, and with only routine experimentation such a glass with a desired log 4 viscosity temperature in relationship to its liquidus temperature can be easily developed. The relationship is as follows:

(Equation I)

$T = 4100 - 6.7$ (wt. percent $SiO_2$)–
  17.54 (wt. percent $Al_2O_3$)
 –58.6 (wt. percent MgO)–
  112.9 (wt. percent $Li_2O$)
 –105 (wt. percent $ZrO_2$)–
  76.1 (wt. percent $TiO_2$)
 –22.6 (wt. percent $SnO_2$)–113 (wt. percent F)
 –10.2 (wt. percent $P_2O_5$)–22.7 (wt. percent BaO)
 –36 (wt. percent ZnO)–35.7 (wt. percent $Na_2O$)
 –34 (wt. percent $Sb_2O_5$)

where T is the temperature in degrees Fahrenheit at which the logarithm of the viscosity of the glass is 4. While my glass compositions have liquidus temperatures below 2460° F., the exact temperature of the liquidus below this maximum temperature is not precisely predictable for a given specific glass composition of the invention, as will be understood, since it depends upon complex phase relationships that have not been worked out for the large number of components present in my glasses. For this reason some routine experimentation, starting with one or more of the specific compositions set forth herein, may be needed to develop a glass having a particular relationship between high temperature viscosity and liquidus temperature.

In addition, then, to the maximum liquidus temperature of my glasses, the glasses preferably have a log 4 viscosity temperature of 2450° F. or lower. Usually, also, the log 4 viscosity temperature of the glass is preferably not more than 200° F. lower than its liquidus, much more preferably not more than 100° F. lower.

In addition to the essential property of the new glasses of the invention i.e., the property of having liquidus temperatures below 2460° F., my glasses also meet a certain essential minimum standard as to type and degree of crystallization, when heat treated, as follows:

Standard crystallization test

This minimum standard is that the glass is capable of forming, when heat treated as described in the following paragraph, a ceramic product having a porosity of zero whose entire interior will contain a multitude of randomly oriented crystals, essentially all of which are less than 25 microns across in their largest lineal dimension; further, the extent of such crystallization will be such that the average coefficient of lineal thermal expansion per ° C. (over the range from 0 to 300° C.) will be no more than sixty percent that of the original glass before the crystallizing heat treatment, and will be, in any event, less than $25 \times 10^{-7}$/° C.

The heat treatment is as follows: A ³⁄₁₆″ diameter cane sample of the glass is heated at a rate of about 10° F./minute to its annealing point temperature and thereafter at the rate of about 2° F./minute to 50° F. above the annealing point temperature. From this temperature the sample is heated for the next 50° F. at a rate of 10° F./hour; then it is heated at a rate of about 5° F./minute to 240° F. above the annealing point and held there for 1.5 hours, then heated at the same rate to 280° above the annealing point and held there for 1.5 hours. The specimen is then heated at a rate of about 10° F./minute to 1850° F., from which temperature it is heated to 1950° F. at a rate of 1° F./minute after which it is cooled to 1800° F. at a rate of about 20° F./minute. Thereafter, the specimen can be cooled in ambient room air.

In the foregoing standard crystallization test the annealing point temperature can be determined by ASTM designation C336–54T, with the testing apparatus being calibrated using fibers of standard glasses having known annealing and strain points as specified and published by the National Bureau of Standards.

The foregoing crystallization heat treatment is provided herein as a standard test of an essential feature of the glasses of the invention, viz., the degree and type of nucleation and crystallization of which the glasses of the invention are capable. However, for any particular glass the foregoing heat treatment is not necessarily the optimum heat treatment to give an optimum balance of physical properties in an economically feasible time.

Broadly, the method of the invention comprises forming a glass object or article from a glass of the invention set forth hereinbefore, and thereafter heat treating the glass, first, at a low temperature to form many nuclei or crystallites, and thereafter at a higher temperature to complete crystallization to the desired degree. The optimum heat treatment schedule depends, as will be understood, on the particular glass composition, the ratio of its ingredients and the type and amount of its nucleants, as well as the final properties desired. Therefore, it is not possible to specify a heat treatment schedule that will be common to all of the glasses of the invention. However, it is usually preferred that the first-mentioned low temperature heat treatment be in the region of maximum or high rate of nuclei or crystallite formation, wherein "nuclei" are defined as submicroscopic precursors of crystalline species or as a finely dispersed submicroscopic immiscible glassy phase. It is difficult to measure directly the area or range of temperatures in which the maximum rate of nuclei formation occurs, or in other words where the optimum temperature for the initial heat treatment is to be located. However, this temperature usually lies in the range from the annealing point of the glass to 250° F. above the annealing point of the glass.

While this maximum rate of nuclei formation temperature range is difficult to measure directly, the optimum initial heat treatment temperature can be empirically determined employing small droplets of the glass and a micro-furnace capable of very rapid temperature change and accurate temperature control. A droplet of the glass that has been cooled to below the annealing point temperature, can be rapidly heated in the micro-furnace to a specific temperature between the annealing point and 250° F. above the annealing point, and held at such temperature for a specified time interval, the length of time of heating depending, again, upon the particular glass. Thus, if the glass inherently very rapidly forms nuclei, a shorter standard time at the low temperature can be used than if the nuclei are relatively only slowly formed. In any case, as an example, a droplet of the glass can be heated for 15 minutes at 40° F. above the annealing point temperature. Thereafter the droplet of glass in the microfurnace is very rapidly heated to a predetermined crystallization temperature within the range, say, from 1800–1950° F. and held at such predetermined temperature for a specific length of time, for instance, one-half hour. This process can be repeated, using the same length of time of initial and final heating and the same temperature of final heating, but using different initial heating temperatures, say 30, 50, 60, 70 and 80° F. above the annealing point temperature. Thereafter by microscopic examination, one can determine which initial heat treatments resulted in formation of the most and finest crystals, and thus determine the range of temperatures where maximum number of crystallization centers are formed.

The process of the invention thus usually comprises heat treating the formed article in an optimum initial temperature range between the annealing point and 250° F. above the annealing point for a time of at least 5 minutes, usually at least 15 minutes, and thereafter heat treating at a higher crystallization temperature. The time of initial heat treatment has no upper limit; usually it is not more than 4 or 5 hours, but longer times are not in the least harmful and merely increase the cost of processing. The crystallization heat treatment stage is effected at higher temperatures in the range from about 1400–2100° F. with a sufficient length of time of heating in this range to effect in situ crystallization to the extent that the resulting glass-ceramics product has a lineal coefficient of thermal expansion no more than sixty percent that of the original glass over the range from zero to 300° C. The overall heat treatment chosen, that is, the initial or nucleation heat treatment and the crystallization heat treatment results in a multitude of very small, randomly oriented, substantially homogeneously dispersed crystals, essentially all of which crystals are in their largest lineal dimension less than 25 microns across.

In a preferred embodiment, when the object is to make a ceramic body or shaped article having as a main crystalline phase spodumene or spodumene-like crystalline phases as indicated by X-ray diffraction techniques, the crystallizing heat treatment includes the range of about 1800–2100° F. Again, it must be noted that the optimum time and temperature for the crystallizing heat treatment depends on the glass composition and its initial heat treatment. Time intervals in the range from 1400–2100° F. or in the preferred range from 1800–2100° F. can vary widely, but the times are usually from about 15 minutes to about 3 or 4 hours, usually not over 2 hours, longer times usually being employed at lower temperatures and vice-versa. As will be understood, when going from the initial heat treatment temperature to the higher crystallization temperature of about 1800–2100° F. it is usually preferred to proceed slowly enough so that appreciable crystallization takes place in the intermediate temperature range, at least to such a degree that a rigid crystalline network is formed that prevents the article from slumping. In this intermediate temperature range beta-eucryptite or beta-eucryptite-like crystalline forms usually appear, and thereafter are in some manner converted to beta-spodumene or beta-spodumene-like crystalline forms at the higher temperature range. As will be seen from the specific examples shown in Table III, I usually prefer an appreciable heating time in this intermediate temperature range. Although the specific examples show several plateaus of heat treatment temperatures, the entire heat treatment can be effected using slowly and continuously rising temperatures. When the highest temperature of the crystallization heat treatment step is limited to the range of about 1400 to about 1675° F., again for a sufficient period of time that the lineal coefficient of expansion of the ceramic product is no more than sixty percent of the coefficient of the original glass, a main crystalline phase formed is beta-eucryptite or a beta-eucryptite-like phase, as indicated by X-ray diffraction; since beta-eucryptite is a very low expansion phase, the resulting ceramics are also often very low expansion, depending in part upon the extent of the crystallization. As the temperature is increased over about 1650° F. in the crystallization heat treatment, one can obtain mixtures of beta-eucryptite-like crystals and beta-spodumene-like crystalline species. It is also to be noted that products made employing crystallization heat treatment temperatures no higher than about 1400 to about 1675° F. are often transparent or highly translucent. This occurs usually when the initial heat treatment has resulted in a very large number of crystallization centers or nuclei being formed, so that the resultant crystals grown at the higher temperature are too small to scatter visible light. Sometimes a phenomenon of transparency or near-transparency is also caused by a similar index of refraction between the crystalline species and the remaining glass. As an example of an almost entirely transparent glass-ceramic formed by this method, note the following: a glass having the approximate composition: 70.7% $SiO_2$, 16.8% $Al_2O_3$, 3.4% $Li_2O$, 1.8% $TiO_2$, 1.3% $ZrO_2$, 3.9% MgO, 1.4% $P_2O_5$, 0.5% $Na_2O$, 0.1% $As_2O_3$ and 0.09% F., was melted and formed into flat plates. The glass was cooled to below its annealing point temperature of about 1200° F. and was thereafter heat treated as follows:

| Temperature, °F.: | Hours |
|---|---|
| 1260 | 2 |
| 1320 | 1 |
| 1370 | 1 |
| 1420 | 1 |
| 1470 | 1 |
| 1580 | 1 |

The glass was then rapidly cooled at a rate of about 400° F. per hour. The resultant ceramic had the appearance of nearly transparent glass with an almost unnoticeable haze viewed through its ¼ inch thickness; its lineal coefficient of thermal expansion over the range 0–300° C. was about $9 \times 10^{-7}/°$ C.

The glasses of the invention can be melted in the normal manner in gas-fired furnaces, preferably using slightly oxidizing conditions. Electric boosting can be provided where desired. In the laboratory platinum crucibles can be used, care being taken not to employ over 2 or 3 tenths of a percent of $As_2O_3$ as a refining agent, or the platinum will be attacked. In larger furnaces high quality refractories are employed, such as high-alumina refractories. When employing alumina refractories, it must be remembered that some alumina may enter the composition from the refractories, the amount depending in part upon the volume of charge in relation to the surface area of the furnace, temperature, length of time of melting, etc. Some adjustment in the batch composition is necessary to account for the alumina from the refractory.

In a typical example of the invention, the following batch materials were melted at a glass temperature of 2900° F. for about 43 hours in a high-alumina refractory (Monofrax M) tank furnace, using a slight excess of air for an oxidizing atmosphere. The batch is shown below with the theoretical composition in parts by weight:

| | Parts by Weight | | Parts by Weight |
|---|---|---|---|
| Petalite [1] | 374.0 | $SiO_2$ | 71.63 |
| Flint [2] | 63.7 | $Al_2O_3$ | 16.5 |
| Alcoa A-10 Alumina [3] | 20.3 | MgO | 4.4 |
| Periclase [4] | 22.8 | $Li_2O$ | 3.3 |
| Florida Zircon [5] | 10.6 | $ZrO_2$ | 1.4 |
| Titanox [6] | 9.0 | $TiO_2$ | 1.8 |
| Aluminum Metaphosphate [7] | 3.8 | $Na_2O$ | 0.2 |
| Lithium Fluoride [8] | 1.37 | $P_2O_5$ | 0.6 |
| Arsenic Trioxide | 1.25 | $F_2$ | 0.2 |
| Niter | 1.25 | $As_2O_3$ | 0.25 |
| Water | 25.0 | | |

[1] 4.2% $Li_2O$, 16.2% $Al_2O_3$, 77.7% $SiO_2$, 0.4% $Na_2O$, 0.2% $K_2O$ and 0.027% $Fe_2O_3$, and other minor impurities, including 1% ignition loss.
[2] 99.9+% $SiO_2$.
[3] 99.5% $Al_2O_3$, 0.03% $Fe_2O_3$, 0.1% $Na_2O$, 0.08% $SiO_2$, 0.2+% ignition loss.
[4] 95.3% MgO, 0.5% $Fe_2O_3$, 2.8% $SiO_2$, 0.3% $Al_2O_3$, 1.1% CaO.
[5] 66% $ZrO_2$, 33.5% $SiO_2$, 0.25% $TiO_2$, 0.1% $Fe_2O_3$.
[6] Substantially pure $TiO_2$.
[7] Substantially pure, except about 1% ignition loss.
[8] Essentially pure LiF.

Of course, a good percentage of both $As_2O_3$ and fluorine are lost because of volatilization, as would be expected.

In contrast to the theoretical composition of the resulting glass, the analyzed composition in weight percent, with the figures rounded off, was as follows:

| | |
|---|---|
| $SiO_2$ | 71.2 |
| $Al_2O_3$ | 17 |
| MgO | 4.3 |
| $Li_2O$ | 3.2 |
| $ZrO_2$ | 1.3 |
| $TiO_2$ | 1.8 |
| F | 0.14 |
| $P_2O_5$ | 0.6 |
| $Na_2O$ | 0.5 |

In addition, a negligible amount of $As_2O_3$ was retained in the glass, and the glass contained less than 0.05 weight percent iron oxide, expressed as $Fe_2O_3$. The glass had an annealing point of approximately 1210° F., a log 4 viscosity temperature of about 2390° F., and a liquidus temperature of about 2355° F. A number of glass rods (cane) were pulled from the tank during the time that the glass was from 2425 down to 2275° F. The cane was about 3/16″ in diameter. It was set aside for heat treatment and determination of properties of the resulting heat treated product. Also, a number of 5 ounce tumblers were made from the glass in a paste mold, and several 5″ diameter bowls were pressed from the glass in a press mold. The cane and the formed articles were subsequently heat treated as follows:

The glass rods and the articles were rather rapidly heated to 1100° F., thereafter the heating schedule is shown below:

Heat treatment schedule

Heated from 1100 to 1200° F. at a rate of 145°/hr.
Heated from 1200 to 1300° F. at a rate of 25°/hr.
Heated from 1300 to 1600° F. at a rate of 50°/hr.
Heated from 1600 to 1950° F. at a rate of 145°/hr.
Held at 1950° F. one hour.
Cooled at a rate of about 400° F./hr.

The foregoing heat treatment schedule is depicted graphically, immediately below:

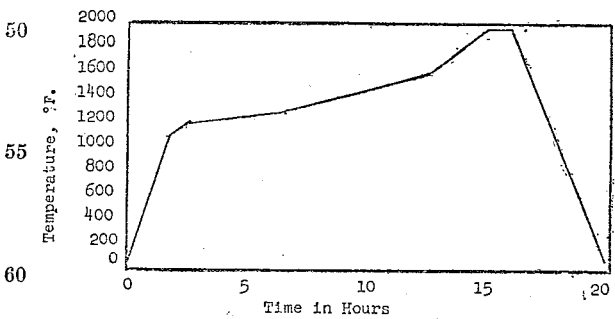

The heat treated articles were white, very fine-grained, glossy and strong. Specifically, the modulus of rupture of the abraded rods tested was 19,000 p.s.i., and they withstood thermal shock when plunged into water at about 1300° F. temperature differential. Thus, the rods were at about 1380° F., while the water was at about 80° F. or less. The measured average coefficient of lineal thermal expansion of the rods was $18.7 \times 10^{-7}$ between 26 and 694° C.

Following in Table III are further illustrative specific examples of glasses and the ceramics resulting from them according to the method of the invention.

TABLE III *

| Example No. | Composition, parts by weight | | | | | | | | | | | | | Glass Properties | | | Heat Treatment | | Ceramic Properties | | |
|---|---|---|---|---|---|---|---|---|---|---|---|---|---|---|---|---|---|---|---|---|---|
| | SiO₂ | Al₂O₃ | MgO | Li₂O | ZrO₂ | TiO₂ | SnO₂ | F | P₂O₅ | BaO | ZnO | Sb₂O₃ | As₂O₃ | Na₂O | Other | Ap. °F. | Liq. °F. | Lgη=4 °F. | °F. | Hrs. | MR | TS | TE | Range °C. |
| 1 | 67.9 | 16.4 | 6.0 | 3.6 | 1 | 1 | 1 | --- | 1 | --- | 1 | --- | --- | 0.5 | --- | --- | 2,395 | 2,300 | 1,350 / 1,440 / 1,800 | 1 / 1 / 1 | 20 | 1,000 | 18 | (28-349) |
| 2 | 67.9 | 10.2 | 6.5 | 3 | 1 | 1 | 1 | --- | --- | --- | --- | --- | --- | 0.4 | --- | --- | 2,440 | 2,385 | 1,300 / 1,400 / 1,900 | 1 / 1 / 1 | --- | --- | --- | --- |
| 3 | 69.8 | 16.0 | 4 | 3.5 | 1.4 | 1.8 | --- | 0.14 | 1.5 | --- | --- | 0.4 | --- | 0.6 | --- | 1,200 | 2,380 | 2,360 | 1,300 / 1,400 / 1,500 / 1,900 | 2 / 1 / 1 / 1 | 22.3 | 1,200 | 15 | (22-692) |
| 4 | 71.5 | 16.5 | 4 | 3.3 | 1.3 | 1.8 | --- | 0.14 | 0.6 | --- | --- | 0.4 | --- | 0.5 | --- | 1,175 | 2,385 | 2,405 | 1,300 / 1,400 / 1,450 / 1,900 | 2 / 1 / 2 / 1 | 19.3 | 1,200 | 14 | (24-694) |
| 5 | 69.7 | 16.4 | 5 | 2.5 | 1.4 | 1.6 | --- | --- | --- | 3 | --- | --- | --- | 0.4 | --- | 1,275 | 2,380 | 2,430 | 1,300 / 1,500 / 1,900 | 1 / 2 / 1 | 15.7 | 1,000 | 17 | (26-319) |
| 6 | 69.6 | 15.1 | 4.8 | 2.6 | 1.3 | 1.4 | 0.3 | 0.13 | 0.5 | 2.6 | 1 | --- | --- | 0.6 | MnO 0.1 | 1,235 | 2,390 | 2,400 | 1,280 / 1,400 / 1,900 | 2 / 2 / 1 | 19.4 | 1,400 | --- | --- |
| 7 | 69.1 | 16.4 | 5 | 2.7 | 1.5 | 1.5 | --- | 0.14 | 0.6 | 2.7 | --- | --- | --- | 0.4 | --- | 1,260 | 2,430 | 2,400 | 1,330 / 1,500 / 1,900 | 2 / 1 / 1 | 21.6 | 1,300 | 14 | (20-304) |
| 8 | 67.7 | 15.9 | 5 | 3 | 1.2 | 1.5 | 0.3 | --- | --- | 2.5 | 1.3 | 0.8 | --- | 0.6 | MnO 0.2 | 1,250 | 2,340 | 2,345 | 1,300 / 1,500 / 1,900 | 2 / 2 / 1 | 19 | 900 | 16 | (20-321) |
| 9 | 72.4 | 16.3 | 5 | 2.9 | 1.5 | 1.5 | --- | --- | --- | --- | --- | --- | --- | 0.4 | --- | 1,205 | 2,415 | 2,410 | 1,350 / 1,500 / 1,900 | 2 / 2 / 1 | 18.8 | >1,400 | 18 | (31-321) |
| 10 | 68 | 16.4 | 7.6 | 2.6 | 1 | 1 | 1 | --- | 1 | --- | 1 | --- | --- | 0.4 | --- | --- | 2,400 | 2,350 | 1,300 / 1,330 / 1,900 | 2 / 2 / 1 | 19 | 1,000 | 21 | (20-320) |
| 11 | 69.3 | 16.7 | 7.1 | 2.7 | 1 | 1.8 | --- | --- | 1 | --- | --- | --- | --- | 0.4 | --- | --- | 2,370 | 2,350 | 1,300 / 1,480 / 1,900 | 2 / 1 / 1 | 20.7 | 1,000 | 13 | (20-680) |
| 12 | 70.0 | 16.9 | 3.5 | 3.5 | 1.5 | 1.5 | --- | 0.14 | 1.5 | --- | --- | 0.4 | --- | 0.5 | --- | 1,210 | 2,420 | 2,405 | 1,300 / 1,400 / 1,450 / 1,950 | 2 / 1 / 1 / 1 | 26.2 | 1,200 | --- | --- |
| 13 | 67.8 | 16 | 5 | 2.7 | 1.6 | 1.4 | 0.3 | --- | 0.5 | 2.7 | 1 | --- | 0.2 | 0.7 | MnO 0.1 | 1,250 | 2,400 | 2,360 | 1,300 / 1,400 / 1,450 / 1,950 | 2 / 1 / 1 / 1 | 17.5 | 1,100 | 15 | (24-604) |
| 14 | 70.9 | 16.4 | 4.1 | 3.3 | 1.4 | 1.8 | --- | 0.1 | 1.3 | --- | --- | 0.2 | --- | 0.5 | --- | 1,210 | 2,395 | 2,400 | 1,300 / 1,500 / 1,950 | 2 / 1 / 1 | 26.8 | 1,200 | 18 | (24-689) |
| 15 | 71.3 | 16.5 | 5 | 2.7 | 1.4 | 1.8 | --- | 0.14 | 0.6 | --- | --- | --- | --- | 0.6 | --- | 1,255 | 2,400 | 2,390 | 1,300 / 1,550 / 1,900 | 2 / 1 / 1 | 26.2 | 1,300 | --- | --- |

TABLE III *—Continued

| Example No. | Composition, parts by weight | | | | | | | | | | | | | | | Glass Properties | | | Heat Treatment | | Ceramic Properties | | | |
|---|---|---|---|---|---|---|---|---|---|---|---|---|---|---|---|---|---|---|---|---|---|---|---|---|
| | SiO₂ | Al₂O₃ | MgO | Li₂O | ZrO₂ | TiO₂ | SnO₂ | F | P₂O₅ | BaO | ZnO | Sb₂O₅ | As₂O₃ | Na₂O | Other | A.p. °F. | Liq. °F. | Log C=4 °F. | °F. | Hrs. | MR | TS | TE | Range °C. |
| 16 | 71.3 | 16.4 | 4 | 3.5 | 1.4 | 1.8 | | 0.14 | | | | 0.4 | | 0.6 | CaO 0.5 | 1,210 | 2,380 | 2,355 | 1,300 1,400 1,450 1,900 | 1 1 1 1 | 27.8 | 1,100 | 14 | (24-694) |
| 17 | 69.7 | 16.4 | 5 | 2.7 | 1.4 | 1.6 | | | | 2.8 | | | | 0.4 | | 2,275 | 2,365 | 2,410 | 1,400 1,550 1,900 | 2 2 1 | 20.7 | 1,100 | 17 | (26-324) |
| 18 | 69.7 | 17 | 4 | 3.3 | 1.4 | 1.8 | | 0.14 | 2 | | | 0.2 | | 0.5 | | 1,240 | 2,400 | 2,400 | 1,300 1,400 1,900 | 2 2 1 | 25.4 | 1,200 | 14 | (24-694) |
| 19 | 69.7 | 15.4 | 5 | 2.7 | 1.4 | 1.6 | | | 0.6 | 3 | | | | 0.4 | MnO 0.2 | 1,265 | 2,385 | 2,410 | 1,300 1,500 1,900 | 2 2 1 | 16.7 | 1,100 | 19 | (25-299) |
| 20 | 70.4 | 16.4 | 4.4 | 3.3 | 1.4 | 1.8 | | 0.14 | 1.5 | | | 0.2 | | 0.5 | | 1,220 | 2,395 | 2,370 | 1,300 1,500 1,900 | 2 1 1 | 26.9 | 1,300 | 16 | (24-694) |
| 21 | 69.1 | 16.4 | 5 | 2.7 | 1.4 | 1.6 | | | 0.6 | 2.7 | | 0.4 | | 0.4 | MnO 0.1 | 1,260 | 2,385 | 2,410 | 1,350 1,400 1,450 1,500 | 2 1 1 1 | 18.1 | 1,200 | 13 | (23-313) |
| 22 | 69.2 | 15.6 | 5 | 3 | 1.4 | 1.8 | | 0.14 | 3 | | | 0.4 | | 0.5 | | 1,280 | 2,395 | 2,375 | 1,350 1,450 1,900 | 2 2 1 | 22.1 | 1,400 | 16 | (24-689) |
| 23 | 71.6 | 16.9 | 3 | 3.5 | 1.5 | 1.5 | | | 1 | | | 0.4 | | 0.6 | | 1,205 | 2,445 | 2,440 | 1,300 1,450 1,550 1,950 | 2 1 1 1 | 23.7 | 1,300 | 11 | (20-680) |
| 24 | 69.2 | 15.5 | 4.8 | 2.6 | 1.3 | 1.4 | 0.3 | 0.1 | 0.5 | 2.6 | 1 | | | 0.6 | MnO 0.1 | 1,220 | 2,400 | 2,400 | 1,350 1,450 1,950 | 2 2 1 | 20.8 | 1,200 | | |
| 25 | 69.9 | 17 | 5 | 2.7 | 1.2 | 1.8 | | 0.14 | 0.6 | | | | | 0.4 | CaO 1.3 | 1,250 | 2,300 | 2,350 | 1,280 1,400 1,950 | 2 2 1 | 20.9 | 1,000 | | |
| 26 | 71 | 16.6 | 4.3 | 3.5 | 1.4 | 1.8 | | | 0.6 | | | 0.2 | | 0.6 | | | 2,375 | 2,365 | 1,350 1,400 1,450 1,900 | 1 1 1 1 | 24 | 1,200 | 15 | (24-694) |
| 27 | 67.2 | 15.8 | 5 | 2.7 | 1.3 | 1.4 | 0.3 | 0.1 | 0.5 | 3.5 | 1 | 0.4 | | 0.7 | MnO 0.1 | | 2,350 | 2,350 | 1,350 1,450 1,900 | 2 2 1 | 18.2 | 1,000 | | |
| 28 | 71 | 17 | 3.5 | 3.5 | 1.5 | 1.5 | | 0.14 | 1 | | | 0.4 | | 0.5 | | | 2,425 | 2,410 | 1,300 1,450 1,950 | 2 1 1 | 24.7 | 1,300 | 14 | (23-683) |
| 29 | 68.7 | 16.5 | 5 | 2.7 | 1.2 | 1.5 | 1 | | | 2.5 | | 0.4 | | 0.5 | | | 2,405 | 2,410 | 1,280 1,500 2,000 | 2 2 1 | 19.8 | 1,000 | 16 | (24-321) |

TABLE III *—Continued

| Example No. | Composition, parts by weight ||||||||||||| Glass Properties ||| Heat Treatment || Ceramic Properties ||||
|---|---|---|---|---|---|---|---|---|---|---|---|---|---|---|---|---|---|---|---|---|---|---|
| | SiO₂ | Al₂O₃ | MgO | Li₂O | ZrO₂ | TiO₂ | SnO₂ | F | P₂O₅ | BaO | ZnO | Sb₂O₃ | As₂O₃ | Na₂O | Other | AP, °F. | Liq., °F. | Log η=4 °F. | °F. | Hrs. | MR | TS | TE | Range °C. |
| 30 | 71 | 16.9 | 3 | 3.5 | 1.5 | 1.5 | | 0.14 | 1.5 | | | 0.4 | | 0.6 | | 1,200 | 2,440 | 2,448 | 1,300 1,400 1,500 1,900 | 2 1 1 1 | 22.6 | 1,300 | 11 | (24–674) |
| 31 | 69.8 | 17 | 4 | 3 | 1.4 | 1.8 | | 0.14 | 2 | | | 0.4 | | 0.5 | | 1,250 | 2,415 | 2,425 | 1,300 1,450 1,500 1,900 | 2 1 1 1 | 23.3 | 1,400 | 14 | (24–689) |
| 32 | 68.8 | 15.9 | 5 | 2.7 | 1.5 | 1.5 | | | | 2.7 | | 0.8 | | 0.5 | | 1,260 | 2,420 | 2,385 | 1,300 1,450 1,500 1,900 | 2 1 1 1 | 19.6 | 1,100 | 16 | (25–304) |
| 33 | 71.0 | 16.0 | 5 | 2.7 | 1.4 | 1.8 | | 0.14 | 0.6 | | | 0.2 | | 0.6 | | 1,255 | 2,405 | 2,400 | 1,330 1,500 1,900 | 4 1 1 | 22.6 | 1,300 | | |
| 34 | 67.6 | 16.3 | 4.9 | 2.6 | 1.2 | 1.5 | 1 | | 1 | 2.5 | 1 | | | 0.4 | | | 2,400 | 2,405 | 1,300 1,450 1,500 1,900 | 2 1 1 1 | 19 | 1,200 | 16 | (20–330) |
| 35 | 71.7 | 16.7 | 4 | 3.5 | 1.2 | 1.8 | | 0.14 | | | | 0.4 | | 0.6 | | 1,220 | 2,350 | 2,390 | 1,300 1,500 1,900 | 2 2 2 | 23.3 | 1,100 | 12 | (24–694) |
| 36 | 70.7 | 16.6 | 4 | 3.5 | 1.4 | 1.8 | | | 1 | | | 0.4 | | 0.6 | | 1,225 | 2,400 | 2,380 | 1,250 1,350 1,400 1,900 | 2 1 1 1 | 22.2 | 1,400 | 13 | (24–690) |
| 37 | 66.7 | 16.9 | 5.4 | 2.8 | 1.3 | 1.4 | 0.3 | 0.1 | 0.5 | 2.8 | 1.1 | | | 0.6 | MnO 0.1 | 1,230 | 2,340 | 2,340 | 1,350 1,450 1,900 | 1 1 1 | 22.2 | 1,000 | | |
| 38 | 72.4 | 16 | 5 | 2.9 | 1.5 | 1.5 | | 0.14 | | | | 0.2 | | 0.4 | | | 2,415 | 2,420 | 1,280 1,400 1,950 | 4 2 1 | 28 | 1,300 | 14 | (23–683) |
| 39 | 70.2 | 18.3 | 3.3 | 3.5 | 1.5 | 1.6 | | 0.15 | 0.8 | | | | 0.1 | 0.6 | | 1,200 | 2,410 | 2,410 | 1,300 1,450 1,950 | 2 1 1 | 25.9 | 1,000 | 15 | (23–679) |
| 40 | 70.2 | 15.7 | 5 | 2.7 | 1.5 | 1.5 | | | | | 3 | | | 0.4 | | | 2,375 | 2,360 | 1,300 1,400 1,900 | 2 2 1 | 22 | 1,300 | 17 | (20–650) |
| 41 | 70.7 | 16.6 | 4 | 3.5 | 1 | 2.3 | | | 0.9 | | | 0.4 | | 0.6 | | 1,210 | 2,325 | 2,370 | 1,350 1,400 1,450 1,500 1,900 | 1 1 1 1 1 | 21 | 1,300 | 13 | (20–650) |

*Explanation of symbols in Table III:
AP=annealing point temperature.
Liq.=liquidus of the glass composition.
Log η=4=temperature at which the logarithm of the glass viscosity in poises is 4.
MR=modulus of rupture in thousands of pounds per square inch.
TS=thermal shock, ΔT in °F. without failing.
TE=average coefficient of lineal thermal expansion ×10⁷ over indicated temperature range.

Although the annealing point temperature in this application means the temperature determined by the ASTM method previously referred to, or an equivalent method, the annealing point temperatures given in Table III in most cases were not determined by the ASTM method and are not precise. It is believed, however, that most of the determined temperatures are within 15 or 20° of the true annealing point temperature, and in most cases the error is less. The liquidus temperature referred to in this specification has the usual meaning, that is, the maximum temperature at which equilibrium exists between the molten glass and its primary crystalline phase. The liquidus temperatures shown in Table III were quite carefully determined by a fairly precise method employing special platinum boats in a gradient furnace. However, such liquidus temperatures may also in some cases not be precise since they were not determined by the very precise quenching and melting methods employed for the most careful phase diagram work. However, for those liquidus temperatures in Table III which approach closely at all the limiting value of 2460° F., special care was taken to check these temperatures to ascertain with certainty that such liquidus temperatures were in fact below 2460° F.

The log 4 viscosity temperatures in Table III are also not absolutely precise because they are estimated or extrapolated values from viscosities measured at higher temperatures, since it was too time consuming to make repeated measurements at repeated adjustments of temperatures of the glass until one was measuring precisely the temperature at which the logarithm of the viscosity was 4. Methods for determining viscosity are quite well known, and the preferred method involves two concentric cylinders separated by glass and the measurement of the rate of rotation of one cylinder under a given torque. For the general method, see Journal of the American Ceramic Society, vol. 12, No. 8, August 1929, pp. 505–529.

For determining the thermal shock resistance of the ceramics of the invention, cane or rods of the ceramic were plunged into water directly from an oven maintained 80° F. above the temperature shown in the Table III. The water was at 80° F. or lower. A value of 1300° F., for instance in Table III means that the rod did not crack or craze even slightly at the temperature differential indicated, but that it did crack when tested at the next hundred degree interval higher. Slight hairline cracks or crazing were detected by immersing the thermally shocked samples in a dye solution.

The tested flexural strength of the crystallized material was determined using crystallized cane samples, usually of about 0.20 inch in diameter, and in all cases from 0.15 to 0.5 inch in diameter. The modulus of rupture tests were made using a Tinius-Olsen testing machine. This machine applies a measured load through a single knife edge to the center of a 4" long sample of cane supported on two knife edges (3-point loading). The load is applied at a constant rate of 24 pounds per minute until failure occurs, with a marker indicating the highest load applied to the point of failure. Before the cane samples are tested they are abraded uniformly by rotating in a slow-speed drill press in contact with 320-grit emery paper under hand pressure. This technique assures that the abrasions are parallel to the direction of loading. A dial micrometer calibrated in inches and equipped with a bar contact instead of a point contact is used to measure maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture as follows:

$$MR = \frac{\text{Load (lbs.)} \times 8 \times \text{span (in.)}}{(D_1^2 \times D_2)\pi}$$

Each value reported in Table III is the average of a number of cane samples so tested.

Table III illustrates a wide range of glasses and ceramics according to the invention having properties set forth in the specification.

While the glasses and ceramics of the invention have the range of compositions set forth hereinbefore, experience has shown that, within the before-described broad range of glass compositions, generally lower expansion coefficients can be obtained with a somewhat lower top limit of MgO and a somewhat greater lower limit with respect to $Li_2O$. Moreover, a somewhat narrower range of $SiO_2$ and $Al_2O_3$ is now preferred for a good balance of properties in the ceramic products and the glasses of the invention. Thus, a now preferred range of compositions have the following components in the following weight percentages of the glass composition:

TABLE IV

| | |
|---|---|
| $SiO_2$ | 68–72 |
| $Al_2O_3$ | 16–18 |
| $Li_2O$ | 2.8–3.8 |
| MgO | 3–5 |
| $ZrO_2$ | 1.2–1.5 |
| $TiO_2$ | 1.2–<1.9 |
| $SnO_2$ | 0–1.5 |
| $P_2O_5$ | 0–2 |
| BaO | 0–3 |

Also, it is often preferred that the compositions of Table IV contain 0.5–2 weight percent $P_2O_5$ to aid crystallization and to improve surface gloss of the ceramic articles. Further, the foregoing compositions of Table IV can also contain 1.9–<2.4 weight percent $TiO_2$, although this is less preferred for the reasons discussed hereinbefore, see column 7, lines 48–61.

The converted or heat treated products of the invention are called "crystalline," "ceramics," or "crystalline ceramics" and they are, in fact, at least partially crystalline. There is, however, no intent to imply that the "crystalline ceramic" products of the invention contain more crystalline material than glassy material, either by volume or by weight. It now appears that in the present compositions it would be extremely difficult to show the percentage of crystalline material, or to show whether or not the "glassy" material predominates over the "crystalline" material, in any crystallized composition actually containing even approximately equal amounts of crystalline and glassy phases.

It is believed that the crystalline ceramic products of the invention, even the very highly crystallized products, contain a residual glassy phase because the products of the invention have zero porosity. However, because of time limitations this point was investigated for only a few of the hundreds of crystalline ceramic products made. It is believed, however, that the "crystalline ceramic" product claims of the invention are adequately defined without specific reference to a residual glassy matrix, which undoubtedly does exist in all such claimed products of the invention.

The positive statement that can be made with respect to the present "crystalline ceramic" products of the invention is that they contain as predominant crystalline species lithium-containing crystalline phases, either as beta-eucryptite or beta-eucryptite-like crystals or as beta-spodumene or beta-spondumene-like crystals, or both, and that these lithium containing crystalline phases are present in greater amount by volume than any other crystalline material which is present in the claimed "crystalline ceramic" products.

It should also be noted that the present crystalline ceramic products of the invention cannot properly be claimed in pure product-by-characteristics language. A reference must be made in product claims to the fact that the crystalline material is formed by in situ crystallization from a previous made glass body or article. The in situ crystallization probably results in a continuously changing residual glassy phase composition and probably in many crystalline species of slightly different compositions. Moreover, it is probable that none of the crystalline ceramic products of the invention are formed under equilibrium conditions. Also, the crystalline phases are present in such small crystal sizes and abundant quantity that any attempt to study the specific chemical and physical structure in order properly to define my unique crystalline ceramic products, without a reference to the in situ method of their formation, is impossible.

As will be evident to those skilled in the art, modifications of this invention can be made or followed in the light of the foregoing disclosure without departing from the spirit and scope of the disclosure or from the scope of the claims.

I claim:

1. A method for making an at least partially crystalline, non-porous ceramic article which comprises making a thermally crystallizable glass melt having a liquidus temperature below 2460° F. and a composition consisting essentially of the following components, present in the glass in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5, forming and shaping a glass article from said glass, and thereafter thermally crystallizing said article by heating said article in an initial temperature range which is at least as high as the annealing temperature of said glass for at least about 5 minutes and further heating the article in a temperature range which is at least about 1400° F. for a sufficient period of time to produce a ceramic product containing a multitude of substantially homogeneously dispersed crystals, essentially all of which crystals are in their largest lineal dimension less than 25 microns across, said crystalline ceramic having an average lineal coefficient of thermal expansion less than $25 \times 10^{-7}/°$ C. over the range from zero to 300° C. and no more than sixty percent of the expansion coefficient of said glass before said in situ crystallization.

2. A shaped, non-porous, at least partially crystalline ceramic article containing a multitude of substantially homogeneously dispersed crystals, essentially all of which crystals are in their largest lineal dimension less than 25 microns across, said ceramic article having been formed from a pre-formed glass article by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5, said crystalline ceramic having an average coefficient of thermal expansion less than $25 \times 10^{-7}/°$ C. over the range from zero to 300° C. and no more than sixty percent of the expansion coefficient of said glass before said in situ crystallization.

3. A thermally crystallizable glass having a liquidus temperature below 2460° F. and a composition consisting essentially of the following components, present in the glass in the following weight percentages:

| | |
|---|---|
| $SiO_2$ | 68–72 |
| $Al_2O_3$ | 16–18 |
| $Li_2O$ | 2.8–3.8 |
| $MgO$ | 3–5 |
| $ZrO_2$ | 1.2–1.5 |
| $TiO_2$ | 1.2–<1.9 |
| $SnO_2$ | 0–1.5 |
| $P_2O_5$ | 0–2 |
| $BaO$ | 0–3 | where the total weight percent of $$ZrO_2+TiO_2+SnO_2+P_2O_5$$

is at least 2.8, and the total weight percent $Li_2O+MgO$ is at least 6.3.

4. A method for making an at least partially crystalline, non-porous ceramic article which comprises making a thermally crystallizable glass melt having a liquidus temperature below 2460° F. and a composition consisting essentially of the following components, present in the glass in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<2.4 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5, forming and shaping a glass article from said glass, and thereafter thermally crystallizing said article by heating said article in an initial temperature range which is at least as high as the annealing temperature of said glass for at least about 5 minutes and further heating the article in a temperature range which is at least about 1400° F. for a sufficient period of time to produce a ceramic product containing a multitude of substantially homogeneously dispersed crystals, essentially all of which crystals are in their largest lineal dimension less than 25 microns across, said crystalline ceramic having an average lineal coefficient of thermal expansion less than $25 \times 10^{-7}/°$ C. over the range from zero to 300° C. and no more than sixty percent of the expansion coefficient of said glass before said in situ crystallization.

5. A thermally crystallizable glass having a liquidus temperature below 2460° F. and a composition consisting essentially of the following components, present in the glass in the following weight percentages:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5.

6. A thermally crystallizable glass having a liquidus temperature below 2460° F. and a composition consisting essentially of the following components, present in the glass in the following weight percentages:

| | |
|---|---|
| $SiO_2$ | 66–73 |
| $Al_2O_3$ | 15–19 |
| $Li_2O$ | 2.5–4 |
| $MgO$ | 3–6 |
| $ZrO_2$ | 1–1.7 |
| $TiO_2$ | 1–<2.4 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5.

7. A method for making an at least partially crystalline, non-porous ceramic article which comprises making a thermally crystallizable glass melt having a liquidus temperature below 2460° F. and a composition consisting essentially of the following components, present in the glass in the following weight percent ranges:

| | |
|---|---|
| $SiO_2$ | 66–73 |
| $Al_2O_3$ | 15–19 |
| $Li_2O$ | 2.5–4 |
| $MgO$ | 3–6 |
| $ZrO_2$ | 1–1.7 |
| $TiO_2$ | 1–<1.9 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5, forming and shaping a glass article from said glass, and thereafter thermally crystallizing said article by heating said article in an initial temperature range which is at least as high as the annealing temperature of said glass for at least about 5 minutes and further heating the article in a temperature range which is at least about 1400° F. for a sufficient period of time to produce a ceramic product containing a multitude of substantially homogeneously dispersed crystals, essentially all of which crystals are in their largest lineal dimension less than 25 microns across, said crystalline ceramic having an average lineal coefficient of thermal expansion less than $25 \times 10^{-7}/°$ C. over the range from zero to 300° C. and no more than sixty percent of the expansion coefficient of said glass before said in situ crystallization.

8. A thermally crystallizable glass having a liquidus temperature below 2460° F. and a composition consisting essentially of the following components, present in the glass in the following weight percentages:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<2.4 |
| $SnO_2$ | 0–1.7 |
| $P_2O_5$ | 0–3 |
| $BaO$ | 0–5 |
| $ZnO$ | 0–3 | where said glass is composed of 95–100 weight percent of said components, and where the total weight percent of $ZrO_2+TiO_2+SnO_2+P_2O_5$ is at least 2.8, and the total weight percent $Li_2O+MgO$ is 6.3 to 10.5.

9. A shaped, non-porous, at least partially crystalline ceramic article containing a multitude of substantially homogeneously dispersed crystals, essentially all of which crystals are in their largest lineal dimension less than 25 microns across, said ceramic article having been formed from a pre-formed glass article by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 66–73 |
| $Al_2O_3$ | 15–19 |
| $Li_2O$ | 2.5–4 |
| $MgO$ | 3–7.7 |
| $ZrO_2$ | 1–1.7 |
| $TiO_2$ | 1–<2.4 |
| $SnO_2$ | 0–1.7 |
| $P_2O_5$ | 0–3 |
| $BaO$ | 0–5 |
| $ZnO$ | 0–3 | where the total weight percent of $$ZrO_2+TiO_2+SnO_2+P_2O_5$$

is at least 2.8, and the total weight percent $Li_2O+MgO$ is 6.3 to 10.5, said crystalline ceramic having an average coefficient of thermal expansion less than $25 \times 10^{-7}/°$ C. over the range from zero to 300° C. and no more than sixty percent of the expansion coefficient of said glass before said in situ crystallization.

10. A shaped, non-porous, at least partially crystalline ceramic article containing a multitude of substantially homogeneously dispersed crystals, essentially all of which crystals are in their largest lineal dimension less than 25 microns across, said ceramic article having been formed from a pre-formed glass article by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 68–72 |
| $Al_2O_3$ | 16–18 |
| $Li_2O$ | 2.8–3.8 |
| $MgO$ | 3–5 |
| $ZrO_2$ | 1.2–1.5 |
| $TiO_2$ | 1.2–<2.4 |
| $SnO_2$ | 0–1.5 |
| $P_2O_5$ | 0–2 |
| $BaO$ | 0–3 | where the total weight percent of $$ZrO_2+TiO_2+SnO_2+P_2O_5$$

is at least 2.8, and the total weight percent $Li_2O+MgO$ is at least 6.3, said crystalline ceramic having an average coefficient of thermal expansion less than $25 \times 10^{-7}/°$ C. over the range from zero to 300° C. and no more than sixty percent of the expansion coefficient of said glass before said in situ crystallization.

11. A shaped, non-porous, at least partially crystalline ceramic article containing a multitude of substantially homogeneously dispersed crystals, essentially all of which crystals are in their largest lineal dimension less than 25 microns across, said ceramic article having been formed from a pre-formed glass article by thermal in situ crystallization, said glass being a thermally crystallizable glass having a liquidus temperature below 2460° F. and a composition consisting essentially of the following components, present in the following weight percent ranges:

| | |
|---|---|
| $SiO_2$ | 68–72 |
| $Al_2O_3$ | 16–18 |
| $Li_2O$ | 2.8–3.8 |
| MgO | 3–5 |
| $ZrO_2$ | 1.2–1.5 |
| $TiO_2$ | 1.2–<2.4 |
| $SnO_2$ | 0–1.5 |
| $P_2O_5$ | 0–2 |
| BaO | 0–3 |
| ZnO | 0–3 | where the total weight percent of $$ZrO_2 + TiO_2 + SnO_2 + P_2O_5$$

is at least 2.8, said crystalline ceramic having an average coefficient of thermal expansion less than $25 \times 10^{-7}/°$ C. over the range from zero to 300° C. and no more than sixty percent of the expansion coefficient of said glass before said in situ crystallization.

12. A thermally crystallizable glass having a liquidus temperature below 2460° F. and a composition consisting essentially of the following components, present in the glass in the following weight percentages:

| | |
|---|---|
| $SiO_2$ | 68–72 |
| $Al_2O_3$ | 16–18 |
| $Li_2O$ | 2.8–3.8 |
| MgO | 3–5 |
| $ZrO_2$ | 1.2–1.5 |
| $TiO_2$ | 1.2–<2.4 |
| $SnO_2$ | 0–1.5 |
| $P_2O_5$ | 0–2 |
| BaO | 0–3 | where the total weight percent of $$ZrO_2 + TiO_2 + SnO_2 + P_2O_5$$

is at least 2.8, and the total weight percent $Li_2O + MgO$ is at least 6.3.

References Cited
UNITED STATES PATENTS

| | | | |
|---|---|---|---|
| 3,241,985 | 3/1966 | Kuwayama | 65—33 X |
| 3,252,811 | 5/1966 | Beall | 65—33 X |
| 3,282,712 | 11/1966 | Tashiro et al. | 65—33 X |

DONALL H. SYLVESTER, *Primary Examiner.*

F. W. MIGA, *Assistant Examiner.*

UNITED STATES PATENT OFFICE
CERTIFICATE OF CORRECTION

Patent No. 3,380,818            April 30, 1968

William E. Smith

It is certified that error appears in the above identified patent and that said Letters Patent are hereby corrected as shown below:

Column 2, line 31, "lamped" should read -- lamp --. Columns 17 and 18, TABLE III — Continued, in the footnote to the table, line 6 thereof, "TS=thermal shock, ZT in °F. without failing." should read -- TS=thermal shock, $\Delta$T in °F. without failing. --.

Signed and sealed this 2nd day of September 1969.

(SEAL)
Attest:

Edward M. Fletcher, Jr.            WILLIAM E. SCHUYLER, JR.
Attesting Officer                    Commissioner of Patents